United States Patent
Anderson

(10) Patent No.: US 9,216,643 B2
(45) Date of Patent: Dec. 22, 2015

(54) STACKING RADIATOR APERTURE CLOSURE PANELS

(71) Applicant: Ford Global Technologies, LLC, Dearborn, MI (US)

(72) Inventor: Ronald Anderson, Newport Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 14/188,908

(22) Filed: Feb. 25, 2014

(65) Prior Publication Data
US 2015/0239337 A1    Aug. 27, 2015

(51) Int. Cl.
*B60K 11/08* (2006.01)
*B60K 11/04* (2006.01)
*F01P 7/12* (2006.01)

(52) U.S. Cl.
CPC ............... *B60K 11/085* (2013.01); *B60K 11/04* (2013.01); *F01P 7/12* (2013.01)

(58) Field of Classification Search
CPC ........ B60K 11/00; B60K 11/02; B60K 11/04; B60K 11/08
USPC ................................................ 180/68.1–68.5
See application file for complete search history.

(56) References Cited

U.S. PATENT DOCUMENTS

| | | | |
|---|---|---|---|
| 2012/0091757 A1 | 4/2012 | Tregnago et al. | |
| 2012/0097464 A1* | 4/2012 | Waugh | 180/68.1 |
| 2012/0186890 A1 | 7/2012 | Hori et al. | |

FOREIGN PATENT DOCUMENTS

| | | |
|---|---|---|
| DE | 102006054970 | 5/2008 |
| GB | 516021 | 12/1939 |
| GB | 543958 | 3/1942 |

* cited by examiner

*Primary Examiner* — John Walters
*Assistant Examiner* — James Triggs
(74) *Attorney, Agent, or Firm* — Jason Rogers; Brooks Kushman P.C.

(57) ABSTRACT

An apparatus is disclosed for controlling air flow through a radiator. The apparatus includes a first track and a second track that receive a plurality of panels in a sliding relationship. Top and bottom engagement features of the panels engage each other to extend and retract the panels. The panels may be horizontally aligned in an intermediate or central portion of the apparatus that is disposed behind a bumper beam.

16 Claims, 3 Drawing Sheets

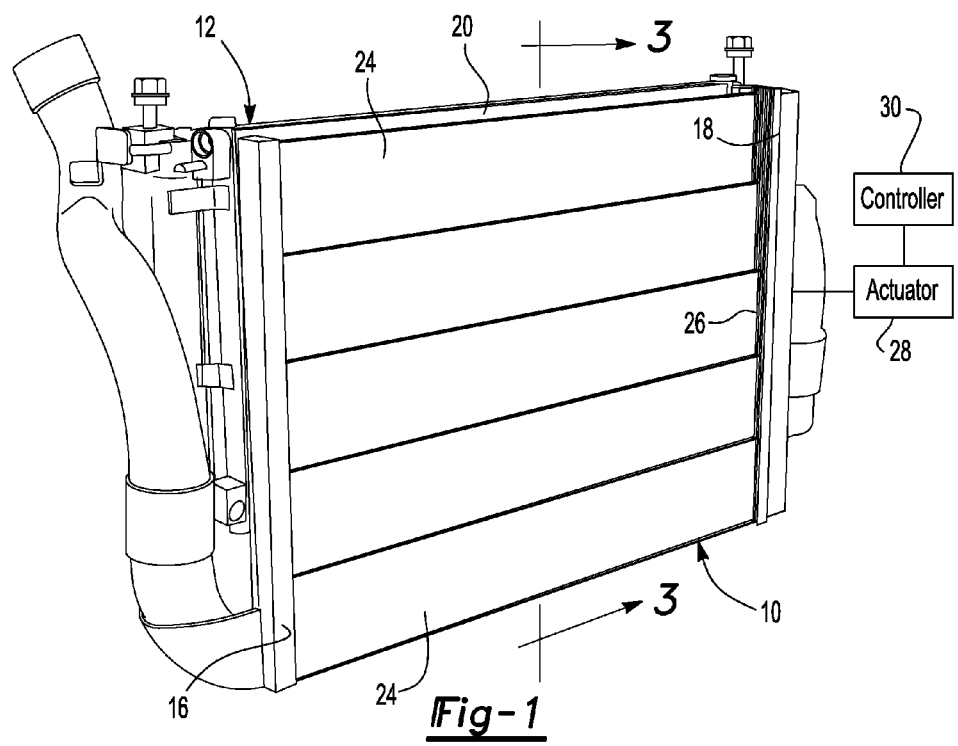
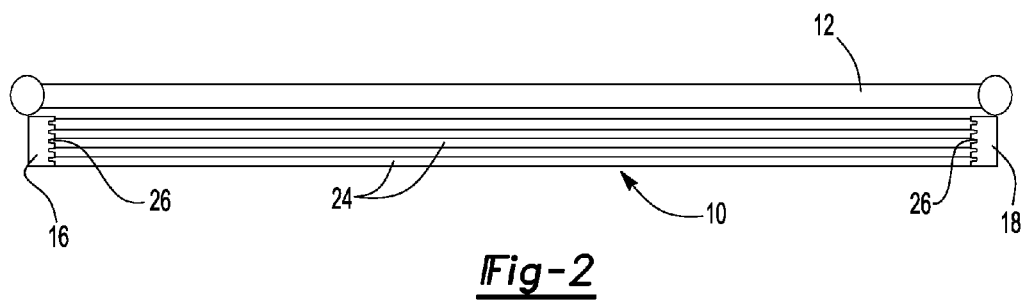

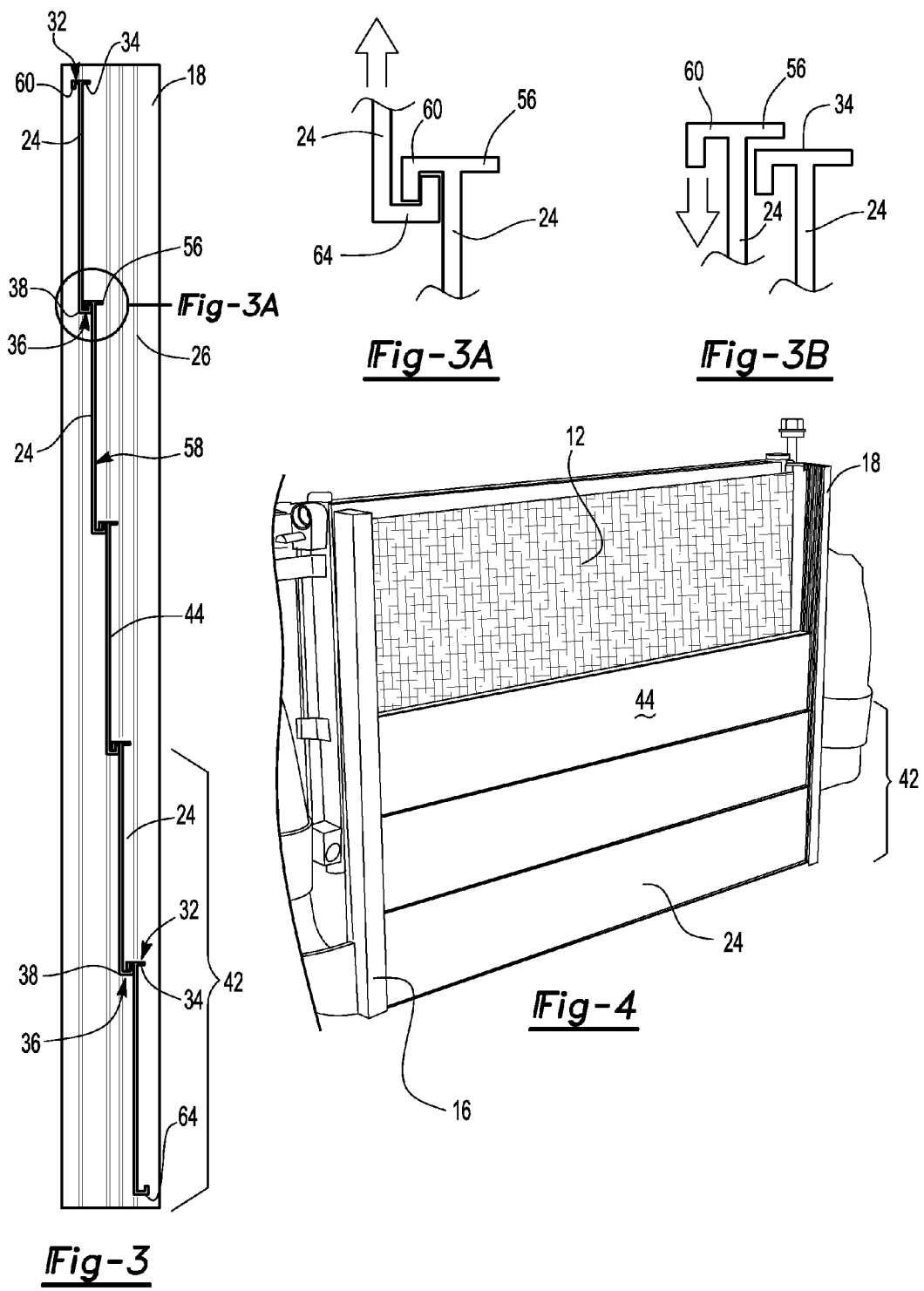

STACKING RADIATOR APERTURE CLOSURE PANELS

TECHNICAL FIELD

This disclosure relates to vehicle radiator aperture closing assemblies that are used to restrict cooling air flow through a radiator.

BACKGROUND

Vehicle radiators may be equipped with shutters or pivoting louvers to reduce engine warm-up time, improve aerodynamics, and reduce the needed to provide warm air to the HVAC system.

The general concept of providing a radiator louver closure mechanism that includes an actuator that pivots the louvers is well-known. Other approaches are known including providing a top and bottom opening roll screen for a radiator as disclosed in US Published patent application 2012/0091757A. The concept of providing a pair of sliding doors by the radiator is disclosed in German Published patent application DE102006054970 A1.

One problem presented by adding a radiator airflow limiting apparatus is that design considerations limit the space available to package such systems near the radiator that results in excessive front overhang. In addition, the effectiveness of an air flow limiting device may be compromised by air flowing around the device in the open space between the device and the outer body surface. Another problem is that the airflow limiting apparatus may block the opening when airflow through the radiator is desired to be maximized.

Radiator airflow limiting devices must be reliable and capable of operating in harsh environments. There is also a need to provide a radiator airflow limiting apparatus that is simple and scalable for different sizes of radiators in a wide range of vehicles.

The above problems and other problems are addressed by this disclosure as summarized below.

SUMMARY

According to one aspect of this disclosure, an airflow control apparatus is provided for a radiator. The airflow control apparatus includes a first track and a second track that are attached to one side of the radiator. A plurality of panels are received in the tracks and an actuator is attached to the panels to move the panels in the tracks from a stacked position with the panels being horizontally aligned to an airflow blocking position with the panels being vertically aligned.

The airflow control apparatus as shown is attached to the radiator and has straight tracks and planar panels, but could alternatively be attached to or in close proximity to a body mounted air inlet grill. The tracks and panels in this type of arrangement may be curved in a semi-cylindrical or barrel stave shape.

According to other aspects of this disclosure, the panels in the stacked position may be disposed at an intermediate location or in a central location in the tracks in the vertical direction.

At least some of the panels may have a first engagement feature on a top edge and a second engagement feature on a bottom edge that engages the first engagement feature of an adjacent panel when the panels are extended from the stacked position. The first engagement feature of one panel may engage the first engagement feature of the adjacent panel when the panels are refracted from the airflow blocking position.

The airflow control apparatus and the radiator may be disposed behind a bumper of a vehicle that blocks airflow through a portion of the height of the radiator with the panels in the stacked position being horizontally aligned with the bumper. The portion of the height of the radiator blocked by the bumper may be the central portion or in an offset location. A top set of the panels may have a first engagement feature on a top edge and a second engagement feature on a bottom edge. The second engagement feature may engage the first engagement feature of an adjacent panel when the panels are extended from the stacked position. The first engagement feature of one panel engages the first engagement feature of the adjacent panel when the panels are retracted from the airflow blocking position.

According to another aspect of this disclosure, the panels may have a top flange on a top edge that extends both in front of the panel and in back of the panel. The panels may also have a bottom flange on a bottom edge that extends in back of the panel. The top flange may engage the top flange of an adjacent panel when the panels are raised from the stacked position towards the airflow blocking position. The top flange of one panel may engage the top flange of an adjacent panel when the panels are moved from the airflow blocking position to the stacked position.

According to another aspect of this disclosure, a radiator closure apparatus is disclosed that comprises a frame including a first side and a second side that define a plurality of tracks extending between a top and a bottom that receive a plurality of panels. The panels extend from the first side to the second side. A first lip on one of the panels selectively engages a second lip on an adjacent panel. An actuator is provided for stacking the panels and un-stacking the panels in the tracks.

According to other aspects of this disclosure relating to the radiator closure apparatus the frame may span a horizontally extending bumper of a vehicle. The frame may extend above and below the bumper and the panels may be moved by the actuator from a stacked position behind and within a height dimension of the bumper to an air flow blocking position with the panels being extended from the top to the bottom.

The radiator closure apparatus may have a first lip that includes a reversely turned, downwardly extending flange on a first side of the apparatus that is engaged by the second lip that includes a reversely turned, upwardly extending flange of an adjacent panel on the first side of the apparatus. The second lip of one of the panels may engage the top lip of the next panel when un-stacking by pulling the next panel. The first lip may also include a flange on a second side of the apparatus that engages the first lip of an adjacent panel, and pushes the adjacent panel for stacking the panels into a horizontal arrangement.

The above aspects of this disclosure and other aspects are described in greater detail below with reference to the attached drawings.

BRIEF DESCRIPTION OF THE DRAWINGS

FIG. 1 is a front perspective view of an air flow control apparatus made according to one aspect of this disclosure shown attached to a vehicle radiator assembly.

FIG. 2 is a diagrammatic top plan view of the air flow control apparatus shown in FIG. 1 attached to a diagrammatically represented vehicle radiator.

FIG. 3 is a cross-sectional view taken along the line 3-3 in FIG. 1.

FIG. 3A is an enlarged view of a bottom engagement feature engaging a top engagement feature of an adjacent panel to raise the panel taken of circle 3A in FIG. 3;

FIG. 3B is an enlarged view of a top engagement feature engaging a top engagement feature of an adjacent panel to lower the panel.

FIG. 4 is a fragmentary front perspective view of the air flow control apparatus and radiator shown in FIG. 1 with the top two panels retracted behind a central panel of the air flow control apparatus.

DETAILED DESCRIPTION

Figure 5:
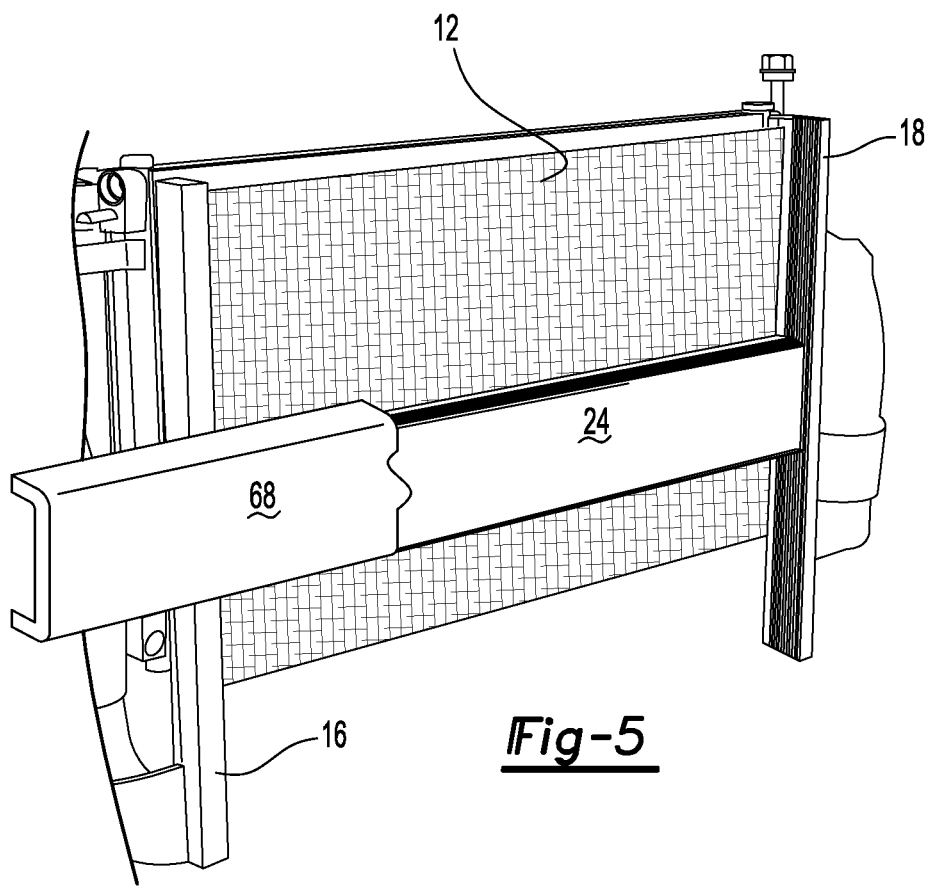
FIG. 5 is a fragmentary front perspective view of a bumper beam and the air flow control apparatus fully retracted and disposed behind the bumper beam.

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Referring to FIG. 1, an air flow control apparatus 10 is shown attached to a radiator 12. Radiator 12 is a heat exchanger which may be used for regulating the temperature of engine coolant. The air flow control apparatus 10 may be disposed in front of the radiator 12 to allow, restrict, or prevent airflow to the radiator 12 to enhance the temperature regulation of the coolant. The air flow control device 10 may also be used with other heat exchangers, such as a condenser (not shown) for an air-conditioning system, or a combination radiator/condenser. The air flow control apparatus includes a first track 16 and a second track 18 that are disposed on opposite lateral sides of the radiator 12. The air flow control apparatus 10 is attached to the front side 20 of the radiator 12. A plurality of panels 24, in this case five panels, is received between the first track 16 and the second track 18 in a plurality of slots 26. In the illustrated embodiment, the tracks 16 and 18 are straight and the panels 24 are flat. Alternatively, the tracks 16 and 18 could be curved and the panels could be shaped to follow the shape of the back of the air inlet grill or another body panel defining the radiator opening. The curved tracks 16, 18 and conforming curved panels 24 must be carefully shaped to collapse relative to each other.

An actuator 28 is used to slide the panels 24 linearly upwardly and downwardly between the first and second tracks 16 and 18. The actuator 28 is diagrammatically represented and could be a ball screw, winding cables, a linear motor, a fluid cylinder, or the like. The actuator 28 is diagrammatically illustrated and is operated by the controller 30. The controller commands the actuator 28 to slide the panels 24 in the tracks 16, 18 to progressively block off or open air flow to the radiator 12. The panels 24 extend between the first track 16 and second track 18 so that driving one panel either drags or pushes adjacent panels 24.

Referring to FIG. 2, the air flow control apparatus 10 is shown in front of a radiator 12 that is diagrammatically represented in FIG. 2. The panels 24 are assembled between the first track 16 and the second track 18. The ends of the panels 24 are received in one of the slots 26 defined by the first track 16 and the second track 18.

Referring to FIG. 3, a cross section is taken through the panels in their fully extended position, as shown in FIG. 1. The panels 24 each include a top engagement feature 32 on a top edge 34 and a bottom engagement feature 36 on a bottom edge 38 of the panels 24. The panels are categorized into a top set of panels 40 comprising the top two panels of the five shown in FIG. 3 and a bottom set of panels 42 comprising the bottom two panels of the five panels in FIG. 3. A center panel 44 is provided between the top set of panels 40 and the bottom set of panels 42. It should be understood that a different number of panels could be provided and that the center panel 44 could be offset to the top or bottom. A different number of panels could be provided in either the top set of panels 40 or the bottom set of panels 42.

The top engagement feature 32 includes a top flange 56. The top flange 56 extends in front of a front side 58 of the panels 24. The top engagement feature 32 also includes a top lip 60. The top lip 60 includes a downwardly extending flange and extends rearwardly in the opposite direction from the top flange 56. A bottom lip 64 is provided on the bottom edge 38 of each panel. The bottom lip 64 includes an upwardly extending flange. The references to top and bottom as used herein refer to relative positions and the specific air flow control apparatus 10 as illustrated. The apparatus 10 could be inverted or in some cases could be angularly oriented or disposed to move in a lateral direction. If so, the terms top and bottom should be interpreted as referring to opposite directions depending upon the orientation of the tracks 16 and 18.

The bottom lip 64 engages the top lip 60 of the next adjacent panel 24 to raise the next adjacent panel. The top flange 56 engages the top engagement feature 32 of the next lower panel 24 when the panels are lowered. The top set of panels 40 may be lowered to a position that is horizontally aligned with the center panel 44. The bottom set of panels 42 are lowered by the actuator 28 (shown in FIG. 1) by moving the lower-most panel 24 downwardly until the top lip 60 on the lower panel engages the bottom lip 64 of the next upwardly adjacent panel 24.

When the panels 24 in the top set of panels 40 are retracted, the top flange 56 of one panel 24 is moved into engagement with the top engagement feature 32 on the top edge 34 of the next lower panel 24 to move the two panels in the top set of panels 40 behind the center panel 44.

When the panels 24 in the bottom set of panels 42 are extended, the top lip 60 of the lower-most panel 24 engages the bottom lip 64 of the next upwardly adjacent panel 24 until they are fully lowered to the extended position shown in FIG. 3. When the panels 24 in the bottom set of panels 24 are raised to the retracted position, the top lip 60 of the top edge 34 of the lower-most panel 24 engages the top flange 56 of the next upper panel 24. The actuator 28 retracts the panels 24 to move the panels 24 in the bottom net of panels 42 behind the center panel 44.

Referring to FIG. 4, the radiator 12 is shown with the two panels 24 of the top set of panels 40 (shown in FIG. 3) retracted behind the center panel 44. The center panel 44 and panels 24 in the bottom set of panels 42 are shown extending between the first track 16 and second track 18. In this position, a partial reduction in the flow of air through the radiator 12 is provided by the center panel 44 and bottom set of panels 42.

Referring to FIG. 5, the radiator 12 is shown with the panels 24 stacked horizontally. A fragment of a bumper beam 68 is shown and the panels 24 are shown horizontally aligned behind the bumper beam 68. In this position, maximum flow of air through the radiator 12 is assured and the panels 24 do not block air flow through the radiator 12 to a greater extent that the blockage caused by the bumper beam 68.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airflow control apparatus for a radiator comprising:
a first track and a second track disposed on opposite lateral sides of the radiator;
a plurality of panels extending between the tracks, a bottom edge engagement feature engages a top edge engagement feature when the panels are extended; and
an actuator attached to the panels to move the panels in the tracks from a horizontally aligned retracted position to a vertically arrayed extended position.

2. The airflow control apparatus of claim 1 wherein the tracks have a top and a bottom and the panels in the retracted position are disposed at an intermediate location in the tracks between the top and bottom.

3. The airflow control apparatus of claim 1 wherein the top edge engagement feature engages the top edge engagement feature of an adjacent panel when the panels are lowered.

4. The airflow control apparatus of claim 3 wherein at least some of the top edge engagement features have a top flange and a top lip, and wherein the top lip engages the top edge engagement feature of an adjacent panel when the panels are lowered.

5. The airflow control apparatus of claim 1 wherein the radiator is disposed behind a bumper of a vehicle that partially blocks airflow through a portion of the radiator, and wherein the panels in the refracted position are horizontally aligned behind the bumper in an intermediate location.

6. The airflow control apparatus of claim 1 wherein at least some of a top set of panels include the top edge engagement feature and the bottom edge engagement feature, and wherein the bottom edge engagement feature of one of the top set of panels engages the top edge engagement feature of an adjacent panel of the top set of panels when the panels are extended from the refracted position.

7. The airflow control apparatus of claim 1 wherein at least some of a bottom set of panels include the top edge engagement feature, and wherein the top edge engagement feature of one of the bottom set of panels engages the top edge engagement feature of an adjacent panel from the bottom set of panels when the panels are retracted from the airflow blocking position.

8. The airflow control apparatus of claim 1 wherein the top edge engagement feature includes a top flange that extends in front of the panel and a top lip in back of the panel, wherein the panels have a bottom lip on the bottom edge engagement feature that extends in front of the panel, wherein the bottom lip engages the top lip of an adjacent panel when the panels are raised, and wherein the top flange engages the top lip of an adjacent panel when the panels are lowered.

9. A radiator closure apparatus comprising:
a frame defining a plurality of opposing tracks extending between a top and a bottom;
a plurality of panels, each cooperating with and extending between one set of opposing tracks, with some panels having a first lip selectively engaging a second lip on an adjacent panel; and
an actuator for stacking and un-stacking the panels by engaging and disengaging the first lip and second lip of adjacent panels, wherein the frame spans a horizontally extending bumper of a vehicle, and wherein the frame extends above the bumper and below the bumper and the panels are moved by the actuator from a stacked position behind and within a height dimension of the bumper to an air flow blocking position with the panels being extended from the top to the bottom.

10. The apparatus of claim 9 wherein the plurality of panels includes a top set of panels and a bottom set of panels, and the top set of panels extends upwardly from behind the bumper and the bottom set descends downwardly from behind the bumper when unstacking.

11. A radiator closure apparatus comprising:
a frame defining a plurality of opposing tracks extending between a top and a bottom;
a plurality of panels, each cooperating with and extending between one set of opposing tracks, with some panels having a first lip selectively engaging a second lip on an adjacent panel; and
an actuator for stacking and un-stacking the panels by engaging and disengaging the first lip and second lip of adjacent panels, wherein the first lip includes a downwardly extending flange extending toward a first side of the apparatus that is engaged by the second lip that includes an upwardly extending flange of an adjacent panel extending toward a second side of the apparatus, the second lip of one of the panels engages the first lip of the next panel when raising the panels.

12. The apparatus of claim 11 wherein the first lip includes a flange extending toward the second side of the apparatus that engages the first lip of an adjacent panel, and pushes the adjacent panel when the panels are lowered.

13. An airflow controller for a heat exchanger comprising:
a plurality of tracks disposed on an inlet side of the heat exchanger;
a plurality of panels, each panel cooperating with a single set of opposing tracks; and
an actuator attached to a panel to move the panels in the tracks from an airflow position with the panels stacked substantially face-to-face to a blocking position with the panels aligned substantially end-to-end, wherein the panels have a top set of panels, a bottom set of panels and an intermediate panel, and the to set of panels extend above the intermediate panel and the bottom set of panels descend below the intermediate panel when moving from the airflow position to the blocking position.

14. The airflow controller of claim 13 wherein the tracks each have a top and bottom, and wherein the panels, in the airflow position, are located at an intermediate location in the tracks between the top and bottom.

15. The airflow controller of claim 13, further comprising a vehicle that has a bumper that partially blocks airflow to the heat exchanger, and wherein the panels, in the airflow position, are aligned with the bumper.

16. An airflow controller for a heat exchanger comprising:
a plurality of tracks disposed on an inlet side of the heat exchanger;
a plurality of panels, each panel cooperating with a single set of opposing tracks; and
an actuator attached to one of the panels to move the panels in the tracks from an airflow position with the panels stacked substantially face-to-face to a blocking position with the panels aligned substantially end-to-end, wherein each panel has a top engagement feature and a bottom engagement feature, the bottom engagement feature engages the top engagement feature of a first adjacent panel when raising the panels, and the top engagement feature engages the top engagement feature of a second adjacent panel when lowering the panels.

* * * * *